United States Patent
Van Der Velde

(10) Patent No.: US 12,192,060 B2
(45) Date of Patent: *Jan. 7, 2025

(54) APPARATUS AND METHOD FOR TRANSMITTING ASSISTANCE INFORMATION IN A WIRELESS COMMUNICATION SYSTEM

(71) Applicant: Samsung Electronics Co., Ltd., Suwon-si (KR)

(72) Inventor: Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,156

(22) Filed: Aug. 28, 2023

(65) Prior Publication Data

US 2023/0412460 A1  Dec. 21, 2023

Related U.S. Application Data

(63) Continuation of application No. 17/248,554, filed on Jan. 28, 2021, now Pat. No. 11,743,129, which is a
(Continued)

(30) Foreign Application Priority Data

Sep. 28, 2018 (GB) ........................ 1815917
Nov. 2, 2018 (GB) ........................ 1817952
Sep. 26, 2019 (GB) ........................ 1913925

(51) Int. Cl.
*H04L 41/0896* (2022.01)
*H04W 52/02* (2009.01)
(Continued)

(52) U.S. Cl.
CPC ..... *H04L 41/0896* (2013.01); *H04W 52/0238* (2013.01); *H04W 72/0453* (2013.01);
(Continued)

(58) Field of Classification Search
None
See application file for complete search history.

(56) References Cited

U.S. PATENT DOCUMENTS 8,538,450 B2  9/2013 Zhang et al.
8,847,669 B2  9/2014 Park et al.
(Continued)

FOREIGN PATENT DOCUMENTS

CN  103765963 A  4/2014
CN  107256043 A  10/2017
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0 (Sep. 2018), 918 pages.
(Continued)

*Primary Examiner* — Alex Skripnikov

(57) ABSTRACT

The present disclosure relates to a communication method and system for converging a 5th-Generation (5G) communication system or networks beyond 5G communication system for supporting higher data rates beyond a 4th-Generation (4G) system with a technology for Internet of Things (IoT). The present disclosure may be applied to intelligent services based on the 5G communication technology and the IoT-related technology. A method of a User Equipment (UE) in a wireless communication system, the method comprising: receiving, from a base station, configuration information on reporting assistance information asso-
(Continued)

ciated with an overheating; detecting the overheating; and transmitting, to the base station, the assistance information including first information for controlling a bandwidth associated with at least one of a first frequency range or a second frequency range based on UE's preference, wherein a first frequency corresponding to the first frequency range is smaller than a second frequency corresponding to the second frequency range.

20 Claims, 11 Drawing Sheets

Related U.S. Application Data continuation of application No. 16/588,937, filed on Sep. 30, 2019, now Pat. No. 10,999,148.

(51) Int. Cl.
| | |
|---|---|
| *H04W 72/0453* | (2023.01) |
| *H04W 72/51* | (2023.01) |
| *H04B 7/0413* | (2017.01) |
| *H04W 4/70* | (2018.01) |
| *H04W 88/06* | (2009.01) |

(52) U.S. Cl.
CPC ........... *H04W 72/51* (2023.01); *H04B 7/0413* (2013.01); *H04W 4/70* (2018.02); *H04W 88/06* (2013.01)

(56) References Cited

U.S. PATENT DOCUMENTS

| | | | |
|---|---|---|---|
| 9,019,880 B2 | 4/2015 | Ehsan et al. | |
| 9,999,037 B2 | 6/2018 | Yang et al. | |
| 10,334,520 B2 | 6/2019 | Wang et al. | |
| 10,582,403 B2 | 3/2020 | Kim et al. | |
| 11,646,943 B2* | 5/2023 | Van Der Velde | ........................... H04W 52/0238 370/241 |
| 2004/0085940 A1 | 5/2004 | Black et al. | |
| 2009/0268690 A1 | 10/2009 | Sebire et al. | |
| 2012/0039176 A1 | 2/2012 | Eshan et al. | |
| 2013/0058309 A1 | 3/2013 | Kuo | |
| 2013/0114508 A1 | 5/2013 | Liang | |
| 2014/0044029 A1 | 2/2014 | Chou et al. | |
| 2014/0334330 A1 | 11/2014 | Baghel et al. | |
| 2016/0127998 A1 | 5/2016 | Roessel et al. | |
| 2016/0183117 A1 | 6/2016 | Hsu et al. | |
| 2017/0164220 A1 | 6/2017 | Roessel et al. | |
| 2018/0049068 A1 | 2/2018 | Agiwal et al. | |
| 2018/0199185 A1 | 7/2018 | Tenny et al. | |
| 2018/0263048 A1 | 9/2018 | Ingale et al. | |
| 2019/0253925 A1 | 8/2019 | Gholmieh et al. | |
| 2020/0022095 A1 | 1/2020 | Kim et al. | |
| 2020/0128479 A1 | 4/2020 | Xu et al. | |
| 2020/0162891 A1* | 5/2020 | Hong | .................... H04W 8/245 |

FOREIGN PATENT DOCUMENTS

| | | |
|---|---|---|
| CN | 107357385 A | 11/2017 |
| CN | 107637126 A | 1/2018 |
| CN | 107820306 A | 3/2018 |
| CN | 107820715 A | 3/2018 |
| CN | 107852634 A | 3/2018 |
| CN | 108401511 A | 8/2018 |
| EP | 3589016 A1 | 1/2020 |
| JP | 2012533932 A | 12/2012 |
| KR | 10-2018-0049775 A | 5/2018 |
| WO | 2017048024 A1 | 3/2017 |
| WO | 2018130115 A1 | 7/2018 |

OTHER PUBLICATIONS

"3rd Generation Partnership Project; Technical Specification Group Radio Access Network; NR; Radio Resource Control (RRC) protocol specification (Release 15)", 3GPP TS 38.331 V15.3.0 (Sep. 2018), 445 pages.
Nokia, et al., "Recap of intended UE assistance to diminish thermal issues," R2-1709212, 3GPP TSG-RAN WG2 #99, Aug. 21-25, 2017, 5 pages.
Samsung (Rapporteur), "Introducing WIs endorsed for ASN. 1 review of 36.331 REL-15 second drop," R2-1810773, 3GPP TSG WG2 NR AH 1807, Jul. 2-6, 2018, 897 pages.
Samsung, "UE assistance parameters for overheating with NR," R2-1814753, 3GPP TSG-RAN WG2 meeting #103 bis, Oct. 8-12, 2018, 2 pages.
Samsung, "IDC reporting with NR," R2-1814751, 3GPP TSG-RAN WG2 meeting #103 bis, Oct. 8-12, 2018, 3 pages.
Samsung, "Corrections concerning IDC Failure," R2-1814752, 3GPP TSG-RAN2 Meeting #103 bis, Oct. 8-12, 2018, 11 pages.
International Search Report dated Jan. 10, 2020 in connection with International Patent Application No. PCT/KR2019/012739, 3 pages.
Written Opinion of the International Searching Authority dated Jan. 10, 2020 in connection with International Patent Application No. PCT/KR2019/012739, 4 pages.
Combined Search and Examination Report under Sections 17 & 18(3) dated Mar. 2, 2020 in connection with United Kingdom Patent Application No. GB1913925.2, 5 pages.
Mediatek Inc, "Temporary capability restriction for thermal mitigation," R2-1811393, 3GPP TSG RAN WG2 #103, 3GPP (Aug. 8, 2018.) See p. 2 lines 5, 6, 17, 18, 20, p. 3 lines 4-7 (Year: 2018).
3GPP TSG-RAN WG2 Meeting #101 R2-1802414, Athens, Greece, Feb. 26-Mar. 2, 2018 (Year: 2018).
3GPP TSG-RAN WG2 Meeting #99 R2-1709544, Berlin, Germany, Aug. 21-25, 2017 (Year: 2017).
Communication dated Dec. 15, 2020 in connection with European Application No. 19865392.5, 11 pages.
Decision of Patent dated Jan. 11, 2021 in connection with Korean Application No. 10-2020-7009306, 8 pages.
3GPP TR 21.915 V0.3.0 (Sep. 2018), Technical Report, 3rd Generation Partnership Project; Technical Specification Group Services and System Aspects; Release 15 Description; Summary of Rel-15 Work Items (Release 15), Sep. 2018, 92 pages.
Ericsson, "UE overheating and capability restriction," R2-1814579, 3GPP TSG-RAN2 Meeting #103bis, Chengdu, China, Oct. 8-12, 2018, 16 pages.
Huawei et al, "Discussion on overheating indication for EN-DC," R2-1811556 (resubmission of R2-1810308), 3GPP TSG-RAN WG2 #103, Gothenburg, Sweden, Aug. 20-24, 2018, 3 pages.
Huawei, et al., "Introduction of the overheating indication," R2-1712039, 3GPP TSG-RAN WG2 Meeting #99bis, Prague, Czech Republic, Oct. 9-13, 2017, 2 pages.
OPPO, "Temporary UE Capability Restriction for Overheating Issues," R2-1814500, 3GPP TSG-RAN2 Meeting #103bis, Chengdu, P. R. China, Aug. 8-12, 2018, 3 pages.
Qualcomm Incorporated, "Extending LTE Overheating mechanism to NR," R2-1803617, 3GPP TSG-RAN WG2 #101, Athens, Greece, Feb. 26-Mar. 2, 2018, 4 pages.
European Search Report issued May 6, 2021, in connection with European Patent Application No. 21154005.9, 14 pages.
Communication pursuant to Article 94(3) EPC issued Jun. 7, 2021, in connection with European Patent Application No. 19865392.5, 8 pages.
VIVO, "Discussion on the IDC report of NR frequency in EN-DC," R2-1802101, 3GPP TSG-RAN WG2 Meeting #101, Athens, Greece, Feb. 26-Mar. 2, 2018, 2 pages.
LG Electronics Inc, "IDC procedure for EN-DC," R2-1808559 (Revision of R2-1806024), 3GPP TSG-RAN2#102, Busan, Republic of Korea, May 21-25, 2018, 2 pages.
VIVO, "Discussion on the IDC solutions for NR SA," R2-1809880, 3GPP TSG-RAN WG2 Nr AH1807 Meeting, Montreal, Canada, Jul. 2-6, 2018, 5 pages.

(56) References Cited

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 14) 3GPP TS 36.331 V14.8.0 (Sep. 2018), Sep. 2018, 773 pages.

Apple Inc: "UE overheating for EN-DC," R2-1802415, 3GPP TSG-RAN2 WG2 Meeting #101, Athens, Greece, Feb. 26-Mar. 2, 2018, 10 pages.

Examination report under sections 12 & 13 of the Patents Act, dated Aug. 26, 2021, in connection Indian Patent Application No. 202017027258, 6 pages.

Office action dated Nov. 23, 2021, in connection with Korean Patent Application No. 10-2021-7004276, 13 pages.

LG Electronics Inc., "IDC procedure for EN-DC," R2-1806024, 3GPP TSG RAN2#101bis, Sanya, China, Apr. 16-20, 2018, 2 pages.

Communication pursuant to Article 94(3) EPC dated Nov. 18, 2022 in connection with European Patent Application No. 21 154 005.9, 10 pages.

Office Action dated Sep. 29, 2022 in connection with U.S. Appl. No. 17/302,356, 6 pages.

Qualcomm Inc, et al., "Introduction of In-Device Coexistence solution for MR-DC," R2-1813450, Change Request, 3GPP TSG-RAN WG2 Meeting #103, Aug. 20-24, 2018, 16 pages.

The First Office Action dated Feb. 27, 2023, in connection with Chinese Patent Application No. 201980012671.0, 14 pages.

Notification of Fulfilling of Registration Formality dated Aug. 30, 2023, in connection with Chinese Application No. 201980012671.0, 10 pages.

Summons to attend oral proceedings pursuant to Rule 115(1) EPC dated Aug. 27, 2024, in connection with European Application No. 21154005.9, 10 pages.

\* cited by examiner

FIG. 2

```
OtherConfig-r9 ::= SEQUENCE{
  reportProximityConfig-r9      ReportProximityConfig-r9    OPTIONAL,-- Need ON
  -- Irrelevant parts omitted
  [[ overheatingAssistanceConfig-r14   CHOICE{
          release                  NULL,
          setup                    SEQUENCE{
              overheatingIndicationProhibitTimer-r14    ENUMERATED {s0, s0dot5, s1,s2, s5, s10,
                                                        s20, s30, s60, s90, s120, s300, s600,
                                                        spare3, spare2, spare1}
          }
      } OPTIONAL    -- Need ON
  ]],
```

FIG. 3

```
UEAssistanceInformation-v1450-IEs ::=    SEQUENCE {
    overheatingAssistance-r14           OverheatingAssistance-r14       OPTIONAL,
    nonCriticalExtension                UEAssistanceInformation-v15x0-IEs
        OPTIONAL
}

OverheatingAssistance-r14 ::=    SEQUENCE {
    reducedUE-Category          SEQUENCE {
        reducedUE-CategoryDL        INTEGER (0..19),
        reducedUE-CategoryUL        INTEGER (0..21)
    }       OPTIONAL,
    reducedMaxCCs       SEQUENCE {
        reducedCCsDL            INTEGER (0..31),
        reducedCCsUL            INTEGER (0..31)
    }       OPTIONAL
}
```

FIG. 5

```
Configuration
OtherConfig-r9 ::= SEQUENCE{
    ...,                          ReportProximityConfig-r9      OPTIONAL, -- Need ON
    [[ idc-Config-r11
    [[ idc-Config-r11             IDC-Config-r11                OPTIONAL, -- Need ON
        powerPrefIndicationConfig-r11  PowerPrefIndicationConfig-r11  OPTIONAL, -- Need ON
        obtainLocationConfig-r11       ObtainLocationConfig-r11       OPTIONAL  -- Need ON
    ]],
    -- Irrelevant parts omitted IDC-Config-r11 ::=        SEQUENCE {
    idc-Indication-r11              ENUMERATED {setup}        OPTIONAL, -- Need OR
    -- Irrelevant parts omitted
    [[ idc-Indication-MRDC-r15    CHOICE{
            release              NULL,
            setup                CandidateServingFreqListNR-r15
        }        OPTIONAL  -- Cond idc-Ind
    ]]
}

CandidateServingFreqListNR-r15 ::= SEQUENCE (SIZE (1..maxFreqIDC-r11)) OF ARFCN-ValueNR-r15
```

FIG. 6

```
InDeviceCoexIndication-v1530-IEs ::=   SEQUENCE {
    idc-Indication-r11          MRDC-AssistanceInfo-r15        OPTIONAL,
    nonCriticalExtension        SEQUENCE { }                   OPTIONAL
}

MRDC-AssistanceInfo-r15 ::= SEQUENCE {
    affectedCarrierFreqCombInfoListMRDC-r15   SEQUENCE   (SIZE (1..maxCombIDC-r11))   OF
AffectedCarrierFreqCombInfoMRDC-r15,
    ...
}

AffectedCarrierFreqCombInfoMRDC-r15 ::= SEQUENCE {
    victimSystemType-r15        VictimSystemType-r11,
    interferenceDirectionMRDC-r15    ENUMERATED {eutra-nr, nr, other, eutra-nr-other,
                                     nr-other, spare3, spare2, spare1},
    affectedCarrierFreqCombMRDC-r15   SEQUENCE {
        affectedCarrierFreqCombEUTRA-r15    AffectedCarrierFreqComb-r15    OPTIONAL,
        affectedCarrierFreqCombNR-r15       AffectedCarrierFreqCombNR-r15
    }    OPTIONAL
}

AffectedCarrierFreqComb-r15 ::= SEQUENCE (SIZE (1..maxServCell-r13)) OF MeasObjectId-r13

AffectedCarrierFreqCombNR-r15 ::= SEQUENCE (SIZE (1..maxServCellNR-r15)) OF ARFCN-ValueNR-r15
```

FIG. 7

| Item | Affected message |
|---|---|
| | Overheating assistance |
| Indication from UE requesting network to release cells in a frequency ragnge e.g. FR2 | UEAssistanceInformation : (NEW) field or by signalling low/zero value of #CCs or bandwidth for FRx |
| Indication from UE requesting network to reduce baseband processing by referring to feature sets in UE capabilities | UEAssistanceInformation : (NEW) field referring to a feature set within UE capabilities |
| Indication from UE requesting network to reduce baseband processing by combined field covering CCs, bandwidth and MIMO layers | UEAssistanceInformation : (NEW) combined field representing aggregated value across all CCs of bandwidth multiplied by MIMO layers |
| | IDC reporting |
| Network configuring the portions of the band for which it wants UE to receive IDC report | RRCConnectionReconfiguration : (NEW) fields one indicating the width and one indicating the center, lower or higher edge of the frequency range |
| UE reporting the portion(s) of the band on which it experiences IDC, while network simply configures UE to report IDC for the centire | RRCConnectionReconfiguration : (NEW) field indicating the frequency band<br>UEAssistanceInformation : (NEW) fields i.e. for each band portion on IDC is experienced one field indicating the width and one indicating the center, lower or higher edge of the affected frequency range |

APPARATUS AND METHOD FOR TRANSMITTING ASSISTANCE INFORMATION IN A WIRELESS COMMUNICATION SYSTEM

CROSS-REFERENCE TO RELATED APPLICATIONS

This application is a continuation of application Ser. No. 17/248,554, filed Jan. 28, 2021, now U.S. Pat. No. 11,743, 129, which is a continuation of application Ser. No. 16/588, 937, filed Sep. 30, 2019, which claims priority to United Kingdom Application No. 1815917.8, filed Sep. 28, 2018, United Kingdom Application No. 1817952.3, filed Nov. 2, 2018, and United Kingdom Application No. 1913925.2, filed Sep. 26, 2019, the entire disclosures of which are hereby incorporated by reference.

BACKGROUND

1. Field

The disclosure relates to issues associated with overheating in User Equipment (UE), such as mobile handsets, smartphones and the like. In a further aspect, it also relates to improvements in and relating to In Device Coexistence (IDC). It relates to fifth generation (5G) or New Radio (NR) systems, and to networks beyond 5G and other systems and devices can benefit from embodiments of the disclosure. Accordingly, this disclosure is not limited to the following terms, and other terms to denote targets having equivalent technical meanings may be used.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post LTE System'. The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency-Shift Keying (FSK) and Quadrature Amplitude Modulation (QAM) (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

UEs are typically portable, battery-operated devices intended for use by users while carrying on their normal activities. Depending on the functions being performed by the UE, the internal temperature of the UE can rise to an undesirable level. The increase in temperature can depend on the number and/or types of activities being undertaken by the UE.

In LTE system, the UE is able to report that the UE is overheating and request the network to reduce the number of Carrier Components (CC) and/or the data rate according to a lower UE category and in response, the network is able to adjust the radio configuration of the UE such that its power consumption may be reduced.

SUMMARY 5G systems differ in some respects from LTE systems. For instance, in 5G, there is no equivalent to "UE category". Furthermore, two distinct frequency ranges are used in NR, each typically supported by separate hardware. Consequently, the approach used in LTE is either not possible or not desirable.

In LTE systems, the UE is able to report that it experiences In-device Coexistence (IDC) problems for a particular band or band combination. 5G systems differ in some respect from LTE. In particular, some bands comprise a relatively large bandwidth and the network may configure the UE to operate in a particular portion of the concerned band. Consequently, using the LTE approach is not desirable.

Embodiments of the present invention aim to address the aforementioned issues and other issues not specifically mentioned here. Aspects of the disclosure address at least the above-mentioned problems and/or disadvantages and provides at least the advantages described below.

In accordance with an aspect of the disclosure, a method of a User Equipment, UE, in a wireless communication system is provided. The method includes receiving, from a base station, configuration information on reporting assistance information associated with an overheating; detecting the overheating; and transmitting, to the base station, the assistance information including first information for controlling a bandwidth associated with at least one of a first frequency range or a second frequency range based on UE's preference, wherein a first frequency corresponding to the first frequency range is smaller from a second frequency corresponding to the second frequency range.

In accordance with another aspect of the disclosure, a method of a base station, in a wireless communication system is provided. The method includes transmitting, to a User Equipment (UE), configuration information on reporting assistance information associated with an overheating; and receiving, from the UE, the assistance information including first information for controlling a bandwidth associated with at least one of a first frequency range or a second frequency range based on UE's preference; and wherein a first frequency corresponding to the first frequency range is smaller from a second frequency corresponding to the second frequency range.

In accordance with another aspect of the disclosure, a User Equipment, UE, in a wireless communication system is provided. The UE includes a transceiver; and a processor operably connected to the transceiver, the processor configured to: control the transceiver to receive, from a base station, configuration information on reporting assistance information associated with an overheating; detect the overheating; and control the transceiver to transmit, to the base station, the assistance information including first information for controlling a bandwidth associated with at least one of a first frequency range or a second frequency range based on UE's preference, wherein a first frequency corresponding to the first frequency range is smaller from a second frequency corresponding to the second frequency range.

In accordance with another aspect of the disclosure, a base station in a wireless communication system is provided. The base station comprising: a transceiver; and a processor operably connected to the transceiver, the processor configured to: control the transceiver to transmit, to a User Equipment (UE), configuration information on reporting assistance information associated with an overheating; and control the transceiver to receive, from the UE, the assistance information including first information for controlling a bandwidth associated with at least one of a first frequency range or a second frequency range based on UE's preference; and wherein a first frequency corresponding to the first frequency range is smaller from a second frequency corresponding to the second frequency range.

According to a various embodiments of the disclosure, there is provided an apparatus and method as set forth in the appended claims. Other features of the disclosure will be apparent from the dependent claims, and the description which follows.

According to a first aspect of the present invention, there is provided a method of operating a User Equipment, UE, in a mobile telecommunication network, comprising the steps of: the network configuring the UE to provide assistance regarding an internal UE problem; the UE performing a monitoring action to determine an occurrence of the internal UE problem; the UE signalling the assistance information to the network, wherein the assistance information comprises one or more UE parameters suitable for adjustment to ameliorate the internal UE problem, wherein the assistance information relates to one or more of: a Frequency Range or a portion thereof; and one or more baseband related features.

In an embodiment, the internal UE problem concerns an overheating event or an In Device Co-existence, IDC, event.

In an embodiment, the UE parameters suitable for adjustment relate to a reduction in at least one function of the UE.

In an embodiment, the assistance information comprises an indication of a range of operational frequencies that the network is requested to disable to reduce overheating.

In an embodiment, the range of operational frequencies comprises Frequency Range 1, FR1, and Frequency Range 2, FR2.

In an embodiment, FR2 is disabled.

In an embodiment, the assistance information comprises an indication of baseband processing features that the network is requested to disable.

In an embodiment, the assistance information comprises either an explicit or implicit indication of the assistance sought.

In an embodiment, when the internal UE event is an IDC event, the assistance information comprises IDC information related to a portion of a frequency band.

According to a second aspect of the present invention, there is provided a UE operable in a telecommunication network to perform a monitoring action to determine an occurrence of an internal UE problem; the UE signalling the assistance information to the network, wherein the assistance information comprises one or more UE parameters suitable for adjustment to ameliorate the internal UE problem, wherein the assistance information relates to one or more of: a Frequency Range or a portion thereof; and one or more baseband related features.

According to a third aspect of the present invention, there is provided network component operable to receive, from a UE, details of an overheating event or an In-Device Co-existence event along with assistance information, wherein the assistance information comprises one or more UE parameters suitable for adjustment to ameliorate the event, wherein the network component is further operable to configure the UE in response to receiving the assistance information.

The skilled person will appreciate that embodiments of the disclosure relate to the provision of UE assistance information for NR frequencies, regardless of which Radio Access Technology (RAT) employed (e.g., NR, LTE or another system).

Further, in the examples which follow, message formats are shown in LTE format, but these are merely exemplary and that messages in other formats or relating to other RATs are also covered by embodiments of the disclosure.

Although a few preferred embodiments of the present invention have been shown and described, it will be appreciated by those skilled in the art that various changes and modifications might be made without departing from the scope of the disclosure, as defined in the appended claims.

Other aspects, advantages, and salient features of the disclosure will become apparent to those skilled in the art from the following detailed description, which, taken in conjunction with the annexed drawings, discloses various embodiments of the disclosure.

According to the disclosure, there is improvements in and relating to addressing overheating in User Equipment in a wireless communication system.

BRIEF DESCRIPTION OF THE DRAWINGS

For a better understanding of the invention, and to show how embodiments of the same may be carried into effect, reference will now be made, by way of example only, to the accompanying diagrammatic drawings in which:

The above and other aspects, features, and advantages of certain embodiments of the disclosure will be more apparent from the following description taken in conjunction with the accompanying drawings, in which:

FIG. 2 shows a message structure associated with an embodiment of the disclosure;

FIG. 3 shows a message structure associated with an embodiment of the disclosure;

FIG. 5 shows a message structure associated with an embodiment of the disclosure;

FIG. 6 shows a message structure associated with an embodiment of the disclosure; and FIG. 7 shows a summary of signalling messages according to an embodiment of the disclosure.

Throughout the drawings, like reference numerals will be understood to refer to like parts, components, and structures.

DETAILED DESCRIPTION

Figure 1:
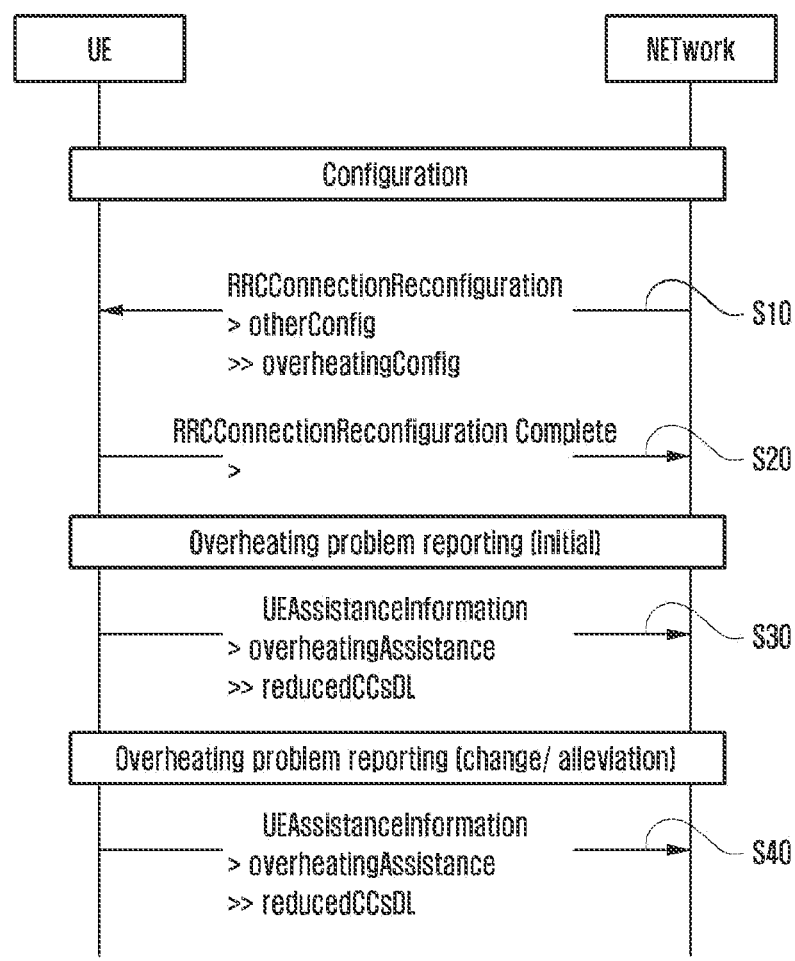
FIG. 1 shows a message exchange according to a first embodiment of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience of description, in the disclosure, terms and names defined in long term evolution (LTE) of a 3rd generation partnership project (hereinafter referred to as "3GPP"), new radio (NR) standards are used. However, the disclosure is not restricted by the terms and names, and may be identically applied to systems complying with other standards.

First, terms used in this specification are defined.

In this specification, a radio bearer may include a data radio bearer (DRB) and a signaling radio bearer (SRB).

For example, a data radio bearer (DRB) provided in a radio interface between a terminal and a base station is a path through which the data of a user plane is forwarded. A signaling radio bearer (SRB) may be a path through which the data of a control plane, such a radio resource control (RRC) layer and non-access-stratum (NAS) control message, is forwarded.

In this specification, a wireless communication system supported in a network over which a plurality of communication systems interwork may support interworking between heterogeneous technologies frequency bands (multi-RAT interworking).

For example, the radio access technology may be a new radio access network (new RAN) supporting all of a 4G radio access technology (E-UTRA), a radio access technology evolved from 4G (evolved E-UTRA), and a 5G radio access technology (new radio (NR)).

In this specification, an inter system supporting same or different communication networks may be basically divided into a terminal, a radio access network, and a plurality of core networks (CNs).

In this specification, a terminal may be an integrated terminal supporting all of a 4G radio access technology (E-UTRA), a radio access technology evolved from 4G (evolved E-UTRA), and a 5G radio access technology (new radio (NR)).

In this specification, a radio access network, a base station, and a network node may be used as the same meaning. A base station may include a 5G base station (or new radio base station or gNB) using the 5G radio access technology (new radio (NR)), a 4G base station (LTE-eNB) using the 4G radio access technology (E-UTRA), and a base station (eLTE eNB) using the radio access technology evolved from 4G (evolved E-UTRA). Furthermore, the base station (eLTE eNB) may support the 4G radio access technology and the 5G radio access technology at the same time.

According to this specification, a wireless communication system, in which a terminal can perform communication with at least one cell associated with a first base station and at least one cell associated with a second base station, may support dual connectivity between the first base station and the second base station supporting heterogeneous or homogeneous radio access technology.

For example, the dual connectivity disclosed in this specification may include a case where both the first and second base stations relates to dual connectivity which concerns a 4G system or a case where the first base station relates to a 4G system and the second base station supports an NR system (E-UTRA-NR dual connectivity, EN-DC). Furthermore, even though the wireless communication system being disclosed in this specification relates to an EN-DC system, the system need not be limited thereto and can also embrace a multi-radio dual connectivity (MR-DC) system.

In an EN-DC system disclosed in this specification, a main base station may be used as the same meaning as a master base station, a master node (MN), or a master eNB (MeNB). A sub-base station may be used as the same meaning as a secondary base station, a secondary node (SN), or a secondary gNB (SgNB).

In the EN-DC system disclosed in this specification, a terminal may be connected to one eNB that operates as a master base station and one en-gNB that operates as a secondary base station.

The eNB may be connected to an EPC through an S1 interface and may be connected to an en-gNB through an X2 interface, and the en-gNB may be connected to the EPC through the S1. The en-gNB may be connected to the EPC through an X2-U interface or an S1-U interface.

In a homogeneous or heterogeneous network supporting small cell evolution, there are various requirements related to mobility robustness, signaling load being increased due to frequent handovers, improvement of throughput per user, system capacity, and the like.

The dual connectivity (DC) may imply control and data disconnection. For example, control signaling for mobility is provided through a macro cell at the same time as the time when a high-speed data connection is provided through a small cell.

Further, a disconnection between a downlink and an uplink and a connection between the downlink and the uplink are provided through other cells.

In the dual connectivity, the UE may be connected to one master node (MN) and one secondary node (SN).

In addition, a DC in which a carrier aggregation (CA) is configured means an operation mode of the UE in an RRC connected state, and it is composed of a master cell group and a secondary cell group.

Here, "cell group" indicates a group of serving cells related to a master base station or a secondary base station in the dual connectivity.

A "master cell group (MCG)" is a group of serving cells related to the master base station, and it includes a primary cell (PCell) and selectively one or more secondary cells (SCells) in the dual connectivity.

A "secondary cell group (SCG)" indicates a group of serving cells related to the secondary base station including a primary SCell (PSCell) and selectively one or more SCells.

Here, the "cell" as described hereinafter should be discriminated from a "cell" as a general area covered by the base station. That is, the cell indicates a combination of resources of a downlink and selectively an uplink.

Linking between a carrier frequency (e.g., center frequency of a cell) of a downlink resource and a carrier frequency of an uplink resource is indicated in system information that is transmitted from downlink resources.

An MCG bearer is a radio protocol located in the master base station only to use only resources provided by the master base station in the dual connectivity, and a SCG bearer is a radio protocol located in the secondary base station only to use resources provided by the secondary base station in the dual connectivity.

Further, a split bearer is a radio protocol located in both the master base station and the secondary base station to use all resources provided by the master base station and the secondary base station in the dual connectivity.

The disclosure covers the following independent aspects, all related to transfer of system information (SI)
1. Overheating
  1.1 By reference to feature sets
  1.2 Indication requesting switch-off RF HW e.g., for FRx (FR1 or FR2)
    1.2.1 Explicit indication
    1.2.2 Implicit indication e.g., indicating low data rate, reduced number of CCs or bandwidth
  1.3 Use of combined indication covering BW, #CCs
2. IDC reporting (for IDC with NR i.e., also covering EN-DC)
  2.1 Support some way to indicate IDC reporting for specific bandwidth either by:
    a) network configuring the bandwidth for which it likes to receive IDC report
    b) UE indicates the parts of the band for which it experiences IDC problems (while network request reporting for entire band)

According to various embodiments of the disclosure, there is provided indication requesting switch-off RF HW, e.g., for FRx (FR1 or FR2). This may either be done by:
  1.2.1 Explicit indication
  1.2.2 Implicit indication e.g., indicating low data rate, reduced number of CCs or bandwidth
Adopted, i.e., mix of a) and b), i.e., explicit/implicit:

UE can request value 0 for the maximum aggregated BW specifically for FR2. It should be noted that signaling allows requesting a value of 0 for both FR1 also (i.e., see field reducedBW-FRn-XL, e.g., reducedBW-FR1-UL, reducedBW-FR1-DL, reducedBW-FR2-UL, reducedBW-FR2-DL), but field description includes a restriction, i.e., that UE does not use value 0 for FR1.

According to various embodiments of the disclosure, there is provided a parameter indicating RF components desired to be switched off, e.g., indication that UE likes to turn off RF components for FR1 or FR2

According to a various embodiments of the disclosure, there is provided Some indication facilitating switching off FR2 (and/or possibly FR1) is desirable. Options to provide this: a) explicit indication, b) implicit indication by (combination of) existing/proposed parameters. Explicit indication seems preferable as explicit indication seems to make possible indication by existing/proposed parameters of a configuration that can be supported on FR1, e.g., indicating low data rate, reduced number of CCs or bandwidth.

Since Overheating only defined in LTE so far, procedures in LTE also apply in case of EN-DC. In this regard, overheating in NR is still under discussion and it needs to be an operation associated with temporary capability change/suspension.

According to a various embodiments of the disclosure, there is provided UE assistance parameters for overheating with NR.

If UE is overheated, it should provide assistance info to the network so it can select a configuration avoiding the problem. In LTE the UE assistance comprises reduced UE category, also for the case of EN-DC.

According to the disclosure, LTE can be used as baseline, but note that some NR differences need to be addressed, e.g., NR UE capabilities do not include a UE category, so there seems a need to address the similar functionality in a different manner. This contribution aims to progress the discussion on the actual assistance parameters/the limited few capabilities the UE may request temporary suspension for.

If UE is overheated, what assistance info can UE provide so network can select a configuration resulting in UE cooling down in some cases, e.g., In LTE UE signals reduced UE category In NR, UE category is not signaled (but derived). Which other parameter to signal to UE that can provide similar functionality (e.g., some indication of baseband processing (i.e., something related to the feature sets)

For example, other parameters include reduced # of CCs, MIMO layer, BW, power factor, reduced BW info (EN-DC), MCS, or data rate According to various embodiments of the disclosure, there is provided that UE can indicate that some of its capabilities are temporarily not available. This information is only used within RAN. And this temporary restriction will be defined for a limited few capabilities, i.e., no general dynamic change of UE capabilities This disclosure discusses some further aspects related to the UE assistance to be provided in case of overheating, that may apply for both EN-DC and for NR SA. The paper focusses on some actual assistance parameters/the limited few capabilities the UE may provide:

An indication facilitating switching of RF component (e.g., FR2 related)

An indication of reduced baseband processing

According to various embodiments of the disclosure, there is provided parameter indicating RF components desired to be switched off (for example, indication that UE likes to turn off RF components for FR1 or FR2)

Indication enabling switch off of RF component (FRx)

Information from UE vendors on RF hardware architecture is very limited.

Vendors would like to have the freedom about which component to use for what task (serving cell, measurement)

Common understanding however is that separate RF hardware will be used for High Frequencies (HF, also referred to as FR2)

Some indication facilitating switching off FR2 (and/or possibly FR1) is desirable Options to provide this:
a) Explicit indication
b) Implicit indication by (combination of) existing/proposed parameters Explicit indication seems preferable as it seems possible to indicate by existing/proposed parameters a configuration that can be supported on FR1 a) For example, indicating low data rate, reduced number of CCs or bandwidth
b) It seems difficult to exclude FR2 by existing parameters, i.e., it seems always possible to assign a configuration on FR2 obeying the restrictions requested by the UE According to the disclosure, it would be useful if UE can provide some indication facilitating switch off of RF components. The proposal is different from the previously proposed indication of the RF structure. That is, the proposal is quite limited and mainly reflecting the common understanding that separate RF hardware will be used for High Frequencies (HF, FR2).

According to the disclosure, it would be good if the UE can provide some assistance/indication that can be used to request release of FR2 (and/or possibly FR1) related configurations and thereby switching off RF components.

There may be different ways to provide such an indication:
a) Explicit indication
b) Implicit indication, i.e., by (combination of) existing/proposed parameters According to the disclosure, it will be difficult to provide the indication implicitly, i.e., by using existing parameters, e.g., by indicating reduced data rate, reduced number of CCs and/or reduced bandwidth. That is, even if the assistance indicates restrictions that could be supported on FR1, there would be similar configurations on FR2 also meeting the configuration reductions requested by the UE.

According to the disclosure, an explicit indication seems preferable and hence propose introduction of an explicit indication by which UE can request release of FR2 (and/or possibly FR1) related configurations (to facilitate switching off corresponding RF components)

According to the disclosure, it would be good if UE can provide some concise indication to request a reduction in baseband processing. In NR, the baseband processing is largely reflected by the so called feature sets that are used, see below for some background.

<Feature Sets>

NR UE capabilities include sort of libraries of feature sets, each being a combination of supported parameter values, i.e., values covering multiple features. For example, a feature set may cover a set of values for 50 parameters and comprise 15 different features/functions supported by the UE There are 2 different libraries of feature sets i.e.,
one for parameters applicable at the level of a band of a band combinations (BoBC) and
one for parameters applicable at the level of per CC of a BoBC Within a BoBC and a per CC of a BoBC, there will be a list of indices, each index pointing to an entry in the corresponding library, and reflecting the supported parameter value combinations According to the disclosure, the UE can request a reduction in baseband processing, by indicating a limitation regarding the supported feature sets. To indicate the reduction, the UE could provide an index pointing to a feature set. Regarding the details of what the index represents, there seem to be two options:

a) The index concerns the last supported feature set, i.e., network is requested to restrict use of all feature sets in the library that are listed after the entry indicated by the index Implies that UE has to roughly list the feature sets in order of increasing baseband processing b) The index defines a combination of parameter values that UE wants support at most, i.e., that network is requested to only use feature sets that, for each parameter have a value less than the one in the indicated feature set Example: The index may point to a combination with 2 parameters, e.g., par1=4, par2=20. Network can use any combination with par1 set to 4 or less and par2 set to 20 or less Some further remarks regarding these options:

Option B is simplest

Referring to the previous example: A combination with par2 set to 6 and par2 set to 10 may require a similar baseband processing as the FS indicated by the index. This solution does however not support use of such combination, i.e., is a bit more crude Option A requires ordering of feature sets
This may imply that solutions to other future problems that would benefit from ordering are not possible anymore.

According to the disclosure, what prefer adopting the simplest solution and hence propose introduction of a concise and generic means to request reduced baseband processing by signaling the feature set indices defines a combination of parameter values that UE wants support at most (i.e., option b)

According to a various embodiments of the disclosure, there is provided parameter indicating desired reduction in baseband processing, e.g.,
Some field indicating a feature set limitation
For example, an index pointing to the last feature set combination in the common library that can still be supported
Would mean UE has to roughly list them in order of increasing baseband processing
Parameter indicating desired reduction in baseband processing
An index pointing to a feature set can be used to indicate a requested reduction in baseband processing as follows (options)
A. Indicated FS concerns the last supported feature set, i.e., that network is requested to restrict use of all feature sets in the common library that are listed after the entry indicated by the index
Implies that UE has to roughly list the feature sets in order of increasing baseband processing
B. Indicated FS indicates a combination of parameter values that UE can support at most. That is, network is requested to only use FS combinations of which for each parameter the value is less than the one used in FS indicated by the index
Example: The index may point to a combination with 2 parameters, e.g., par1=4, par2=20. Network can use any combination with par1 set to 4 or less and par2 set to 20 or less
Evaluation of options
A. Option B is simplest but somewhat more crude:
A combination with par2 set to 6 and par2 set to 10 may require a similar baseband processing as the FS indicated by the index. This solution does however not support use of such combination, i.e., is a bit more crude
B. Option A requires ordering of feature sets
This may imply that solutions to other future problems that would benefit from ordering are not possible anymore.
Note that with NR feature sets are used, which largely reflect the baseband processing
Baseband processing is largely reflected by feature sets
There are libraries of feature sets each being a combination of supported parameter values, i.e., values covering multiple features, e.g., a feature set may cover a set of values for 50 parameters and comprise 15 different features/functions supported by the UE.

Feature sets are used at the level of a band of a band combinations (BoBC) as well as at the level of per CC of a BoBC, i.e., Within a BoBC and a per CC of a BoBC, there will be a list of indices reflecting the supported feature sets.

This disclosure discusses some further aspects related to the UE assistance to be provided in case of overheating, that may apply for both EN-DC and for NR SA. The paper focusses on some actual assistance parameters/the limited few capabilities the UE may provide. We request RAN2 to discuss and conclude the following related proposals:
Proposal 1: Introduce an explicit indication by which UE can request release of FR2 (and/or possibly FR1) related configurations (to facilitate switching off corresponding RF components)
Proposal 2: Introduce a concise and generic means to request reduced baseband processing by signaling the feature set indices defines a combination of parameter values that UE wants support at most (i.e., option b)

NR or 5G radio networks are operable over an extended range of frequencies compared to LTE networks. In particular, NR operates in two distinct ranges, known as Frequency Range 1 (FR1) and Frequency Range 2 (FR2). When reference is made in this application to "frequency range" in lower case, it is intended to refer to a range of frequencies over which a device may operate. References to FR1 or FR2 are to be interpreted in the light of their definitions in the applicable standards. Currently, FR1 is defined to span 450 MHz-7.125 GHz and FR2 is defined to span 24.25 GHz-52.6 GHz.

In an embodiment of the disclosure, the network configures a UE to be able to send to the network so-called assistance information, in the event that the UE senses an overheating event. The sensing of the overheating event may be performed in a known manner using a known temperature sensor. Given the relatively intense computational load of a UE operating with a 5G or other network, it is envisaged that overheating may be more common than in earlier network types. Overheating can, in extreme cases, damage the UE and so it is desirable to take steps to prevent this.

According to a various embodiments of the disclosure, there is provided UE assistance parameters for overheating with NR.

This disclosure discusses some further aspects related to the UE assistance to be provided in case of overheating, that may apply for both EN-DC and for NR SA. The disclosure focusses on some actual assistance parameters/the limited few capabilities the UE may provide:
An indication facilitating switching of RF component (e.g., FR2 related)
An indication of reduced baseband processing FIG. 1 shows the steps involved in a method according to an embodiment of the disclosure. A UE 10 is in communication with a network 20, via a base station. In the configuration phase, the network 20 configures (S10) the UE 10 to provide assistance information, related to overheating. In response, the UE confirms (S20) that configuration is complete.

For example, the network 20 supports a radio access technology, which may be a new radio access network (new RAN) supporting all of a 4G radio access technology (E-UTRA), a radio access technology evolved from 4G (evolved E-UTRA), a 5G radio access technology (new radio (NR)), or a technology beyond 5G.

In this specification, a radio access network, a base station, and a network node may have the same meaning. A base station may include a 5G base station (or new radio base station or gNB) using the 5G radio access technology (new radio (NR)), a 4G base station (LTE-eNB) using the 4G radio access technology (E-UTRA), and a base station (eLTE eNB) using the radio access technology evolved from 4G (evolved E-UTRA). Furthermore, the base station (eLTE eNB) may support the 4G radio access technology and the 5G radio access technology at the same time.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

In the event of sensing an overheating event, the UE signals (S30) to the network that an event has been sensed and provides assistance information to the network. The assistance information includes information regarding configuration limitations the UE requests the network to consider. In particular, the assistance information can include details of a frequency range (FR) which may be limited or disabled to address overheating. In practice, the frequency range which will typically be limited or disabled is FR2. Instead of, or as well as, restricting the frequency of operation, the assistance information may indicate a desired limitation in some other UE functionality. This may include, for instance, a reduction in baseband processing, which may be indicated by means of reference to a feature set as included in UE capabilities by, e.g., an index pointing to the last feature set combination in the common library which can still be supported or an index pointing to a feature set combination defining the maximum values of all baseband parameter value combinations network is requested to observe as a limit to address overheating.

The terms of the maximum values of all baseband parameter value indicates at least one of a sum of bandwidth associated with downlink or uplink carrier of a specific frequency region, a number of carrier component associated with downlink or uplink cell, or a number of MIMO layers associated with downlink or uplink layer of each serving cell on a specific frequency region.

The network is requested to control a parameter associated with at least one of a bandwidth, a carrier component, a MIMO layer based on the assistance information.

The assistance information includes at least one of first information related to a bandwidth, second information related to a carrier component, or third information related to a MIMO layer.

The assistance information includes the first information indicating UE's preference on a sum of bandwidth associated with downlink or uplink carrier of a specific frequency region.

The network is requested to control a bandwidth associated with downlink or uplink carrier of a specific frequency region based on the value of the first information included in the assistance information.

Controlling a bandwidth includes disabling the bandwidth associated with a specific frequency region or limiting a sum of the bandwidth associated with a specific frequency region based on the value of the first information included in the assistance information. If a value of first information is 0, the network is requested to disable the bandwidth associated with downlink or uplink carrier of a specific frequency region.

If a value of first information is above 0, the network is requested to control a sum of bandwidth associated with downlink or uplink carrier of a specific frequency region to be limited as a specific number corresponding to the value of first information.

The specific number corresponding to the value of first information corresponds to a maximum aggregated bandwidth associated with downlink or uplink carrier of a specific frequency region.

A specific value of first information is not used for a specific frequency region and only applicable for other frequency region.

For example, the value being 0 is not used for a first frequency region, and only applicable for a second frequency region, and a first frequency of the first frequency region being different from a second frequency of the second frequency region. In this case, the first frequency of the first frequency region is smaller than the second frequency of the second frequency region.

A frequency of a frequency region corresponds to a central (center) frequency of the frequency region.

The overheating assistance may also include a single combined parameter by which the UE can request a reduction in number of CCs and/or the MIMO layers.

According to a various embodiments of the disclosure, there is provided indication of #CC (separate value for DL & UL) and indication of MIMO layers, per serving cell (DL & UL).

The assistance information includes the second information indicating UE's preference on a number of carrier component associated with downlink or uplink cell.

The network is requested to control a number of carrier component associated with downlink or uplink cell to be limited as a specific number corresponding to the value of second information.

The specific number corresponding to the value of second information corresponds to a maximum number of carrier component associated with downlink or uplink cell.

The assistance information includes the third information indicating UE's preference on a number of MIMO layers associated with downlink or uplink layer of each serving cell on a specific frequency region.

The network is requested to control a number of MIMO layers associated with downlink or uplink layer of each serving cell on a specific frequency region to be limited as a specific number corresponding to the value of third information.

The specific number corresponding to the value of third information corresponds to a maximum number of MIMO layers associated with downlink or uplink layer of each serving cell on a specific frequency region.

According to a various embodiments of the disclosure, there is provided an indication concerning bandwidth or aggregated bandwidth, or indication per UE, per FR or per CC.

According to various embodiments of the disclosure, there is provided a method of considering one value covering CCs, MIMO and bandwidth. Example, the one value indicates sum across all CCs of per CC the multiplication of bandwidth and MIMO layers: Sum=Bw*MiLa. According to a various embodiments of the disclosure, there is provided other method of considering one value per FR. The other method has main merits associated with coarse, simple and versatile, leaving freedom for network.

Example, the one value indicates sum across all CCs of per CC the multiplication of bandwidth and MIMO layers: Sum=Bw*MiLa.

As an example of this approach, consider the table 1 below:

TABLE 1

| CC1 | | CC2 | | CC3 | | SUM |
|---|---|---|---|---|---|---|
| Bw | MiLa | Bw | MiLa | Bw | MiLa | |
| 100 | 8 | | | | | 800 |
| 80 | 4 | 60 | 8 | | | 800 |
| 50 | 4 | 100 | 2 | 100 | 2 | 800 |

Here, there are three CC examples, each relating to a Bandwidth (BW) and MIMO Layer (MiLa) configuration. Also shown is a "Sum" which is the single combined parameter referred to above, whereby the network is able to configure the UE on the basis of the parameter, choosing configuration values from the various options presented. This approach allows the network to have some freedom to configure, based on the overall request from the UE.

Typically, a UE will require separate RF hardware for each of FR1 and FR2, due to the different frequencies/bands in each case. If one of the FRs (e.g., FR2) can be disabled, then this can save a significant amount of energy and so address the overheating issue. Of course, there will be a reduction in the overall capacity of the UE, but this is a necessary compromise. The reason that FR2 is typically chosen for limitation, instead of FR1, is that usually greater functionality can be maintained through the use of FR1 and so this is an optimum configuration in these circumstances. In particular, it is assumed that, in general, FR2 may use larger bandwidths, consume more power and provide a relatively smaller coverage area than FR1.

The overheating assistance information may include an explicit or implicit indication of the action which the UE would like the network to take. An explicit indication may include an indication of an FR (e.g., FR2) which should be limited or disabled. Alternatively, an implicit indication may be provided, whereby the UE indicates to the network one or a combination of parameters which the network is able to interpret in such a way that it is able to reconfigure the UE to address the overheating issue. For instance, the UE may request the network to not use FR2 by indicating a low value for bandwidth or number of component carriers, such that an explicit request to avoid using FR2 is not made but may be inferred by the network.

Typically, the preferred option is to use an explicit indication so that there is clarity and certainty.

In the event that the assistance information includes information related to restricted baseband processing, as mentioned, then the index pointing to a feature set may be used. There are two alternatives which may be used. In the first case, the indicated feature set concerns the last supported feature set, meaning that the network is requested to restrict use of all feature sets in the common library provided within UE capabilities that are listed after the entry indicated by the index. This alternative requires an appropriate ordering of feature sets, such that their order reflects their relative baseband processing requirements.

In the second case, the indicated feature set indicates a combination of parameter values that the UE can support at most, meaning that the network is requested to use only feature set combinations where each parameter value is less than the one used in the feature set indicated by the index. As an example of this, the index may point to a combination with two parameters where, e.g., paramater1=4 and parameter2=20. The network can use any combination where parameter1 is set to 4 or less and pareameter2 is set to 20 or less. This option is a little less precise that the first option but is simpler to implement. For instance, a combination of parameter1 set to 6 and parameter2 set to 10 may actually require a similar amount of processing power as the feature set indicated by the index (i.e., using the first option, above), but would not be supported by this option since parameter1 is out of range. In other words, this option may be less flexible in practice.

Once the UE has provided (S30) assistance information to the network, the network is operable to determine if the request can be complied with. If so, it reconfigures the UE by means of a message (not shown). The request may be complied with in full, in part or not at all. For instance, if the UE is communicating with 2 cells in FR1 and 2 cells in FR2 and requests that FR2 is disabled, the network may, in response, configure the UE such that 1 cell in each of FR1 and FR2 is released, instead of complying fully with the UE request.

If the overheating situation changes, the UE indicates updated overheating assistance information at step S40. The network may however configure a prohibit timer so that the UE cannot provide updates too frequently, i.e., when the UE sends overheating assistance to the network, it starts the prohibit timer and it can only provide further details of a change after its expiry, The configuration performed by the network may take the form of the message illustrated in FIG. 2.

Referring to FIG. 2, a network configures by overheatingAssistanceConfigConfig: that UE is requested to report overheating but has to observe a prohibit timer (i.e., avoiding too frequent reporting of changes)

The UE may not typically report an overheating event too frequently and to this end, the use of a prohibit timer ensures that the UE may only make reports with assistance information at predetermined intervals. In other words, the reports cannot exceed a predefined frequency.

When the UE reports an overheating event and provides assistance information, this may be in the form a message as illustrated in FIG. 3.

Referring to FIG. 3, UE can report in overheatingAssistance (LTE) reducedUE-Category (limiting a.o. the data rate), reducedMaxCCs (maximum number of carriers).

For EN-DC it was clarified that: This maximum number includes both SCells of E-UTRA and PSCell/SCells of NR in EN-DC.

According to another aspect of the present invention, there is provided an improvement in dealing with In Device Coexistence (IDC).

According to a various embodiments of the disclosure, there is provided IDC reporting with NR.

Since NR band may cover quite large bandwidth, UE may experience IDC problems only for certain parts of the bandwidth and network may configure a UE with part of the bandwidth, i.e., a bandwidth part (BWP).

IDC is concerned with possible interference between different components within a UE. For instance, there may be interference between an NR transceiver and a Wi-fi or Bluetooth transceiver. However, any such interference is unlikely to affect all of a given FR, and the problem may only be experienced over a portion of the relevant bandwidth of a frequency band.

At the same time, the concept of Bandwidth Parts (BWP) is used in NR systems whereby a network is able to configure a UE for one or more BWPs only rather than configuring it to use the entire bandwidth of the concerned frequency band. When the UE experiences IDC in a portion of a given frequency band, the network should still be able to use another portion of the band and configure the UE with a BWP in the part of the concerned frequency band that is not affected by IDC.

This disclosure discusses some further aspects related to IDC reporting for EN-DC and for NR SA. The discussion focusses on IDC reporting in LTE, although some aspects equally apply to IDC reporting in NR.

Whether and if so, how to support IDC reporting for BWP
A clarification of the procedural specification According to a various embodiments of the disclosure, there is provided solution options Network configures, besides ARFCN, the bandwidth the UE should consider when reporting IDC, e.g.,
  a) Configuration: bandwidth is provided/added for every ARFCN in CandidateServingFreqList
  b) Reporting: none, i.e., ARFCN would be different Network only configures ARFCN, UE provides IDC assistance for full bandwidth by reporting the one or more BWP on which it experiences IDC problems, e.g.,
  a) Configuration: none
  b) Reporting: bandwidth is provided/added for every ARFCN in AffectedCarrierFreqCombNR According to a first embodiment, the network configures one or more portion(s) of the bandwidth (not necessarily a BWP) for which the UE should report IDC issues, for example by configuring an Absolute Radio Frequency Channel Number (ARFCN) and a bandwidth. The terms of ARFCN means a channel number used to identify the RF frequency channel.

In this embodiment, the bandwidth can be provided or added for every ARFCN in the CandidateServingFreqList. In terms of reporting, various embodiments of the disclosure may be applied if the ARFCN is not different for each portion of the band.

According to a second embodiment, the network only configures ARFCN and the UE provides IDC assistance for full bandwidth and by reporting the one or more bandwidth ranges on which is experiences IDC problems. In this embodiment, there is no change in configuration. In reporting, bandwidth is provided/added for every ARFCN in AffectedCarrierFreqCombNR.

It should be noted that the ARFCN and bandwidth referred in the previous embodiments indicate the centre, lower or higher edge as well as the width of the frequency range/portion of the frequency band. Persons skilled in the art are aware that there are different ways to indicate the centre, lower or higher edge of the frequency range, e.g., by means of the pointer for the entire frequency band and an offset applicable for the particular portion/frequency range.

Figure 4:
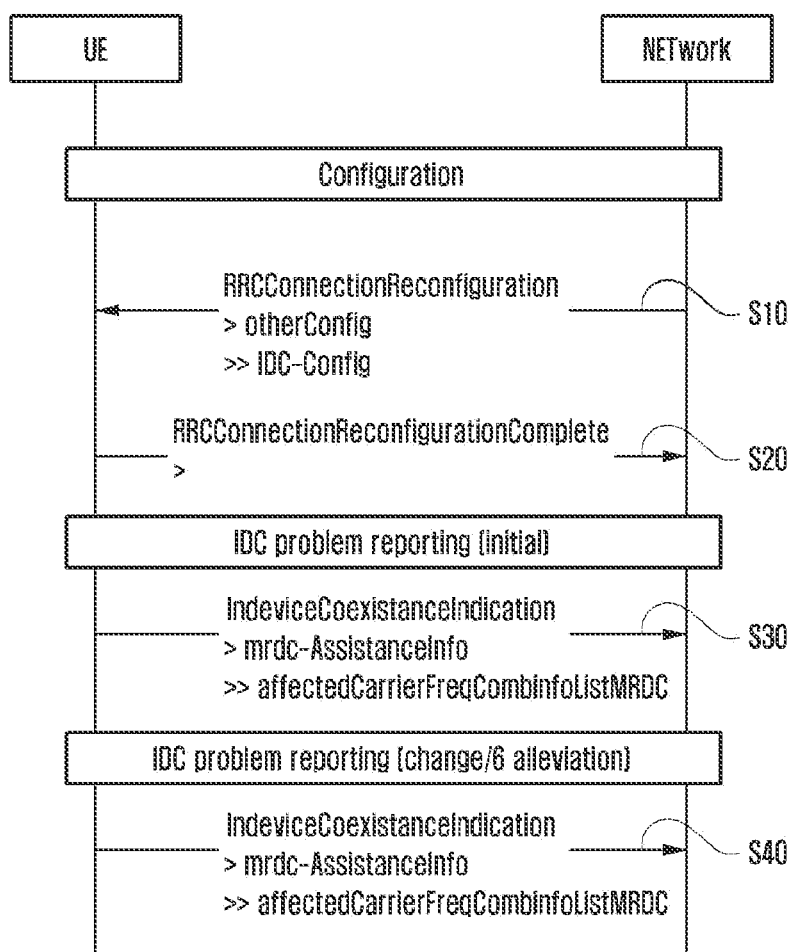
FIG. 4 shows a message exchange according to a second embodiment of the disclosure.

FIG. 4 shows a message exchange in connection with the configuration and reporting according to an embodiment of the present invention.

FIG. 5 shows a message format associated with configuration according to an embodiment. Here, the network configures in idc-Indication-MRDC.

Referring to FIG. 5, a network configures in idc-Indication-MRDC: The NR frequencies for which IDC reporting is requested.

According to a various embodiments of the disclosure, there is provided an IDC reporting for EN-DC. In particular, it was agreed to specify the candidate frequencies by a field within IDC-Config as shown FIG. 5.

An NR band may cover quite large bandwidth. The UE may experience IDC problems only for certain parts of the bandwidth. Moreover, the network may anyhow only like to configure the UE with part of the bandwidth, i.e., by assigning a bandwidth part (BWP). In such case, it would seem undesirable if the network would have to consider the entire band to be unsuitable due to IDC problems.

There seem to be two ways to handle this
  a) Network configures, besides ARFCN, the bandwidth for which the UE should report IDC
  b) The UE monitors IDC for the entire bandwidth, but when providing IDC assistance, the UE indicates one or more BWP on which the UE experiences IDC problems We think option A is simplest. It would involve the following changes
  Configuration: bandwidth is provided/added for every ARFCN in CandidateServingFreqList
  Reporting: no changes are needed Note that we assume there is no real need to support IDC reporting for overlapping BWP with the same center frequency (i.e., same ARFCN). If this would need to be supported also, the UE would also have to report the bandwidth when providing the IDC assistance to the network.

Altogether, we propose the option to configure IDC reporting for a BWP, i.e., by adding the bandwidth to the CandidateServingFreqList in the IDC-Config.

FIG. 6 shows a message format associated with reporting/signalling according to an embodiment.

Referring to FIG. 6, the UE reports in mrdc-AssistanceInfo, affectedCarrierFreqCombListMRDC: MR-DC BCs, i.e., band combinations including the NR bands.

In the table shown in FIG. 7, there is presented a summary of signalling related to embodiments of the present invention. This is provided to summarize new or updated signalling according to an embodiment of the disclosure and to assist in reference to the standardization process.

According to a various embodiments of the disclosure, there is provided Clarification procedural specification.

Below an extract from procedural specification is shown and we like to focus on the yellow highlighted part below. The second yellow highlighted bullet 3 seems not entirely clear, also because it is not entirely clear that it only applies to the last bullet. It seems the intention is to avoid duplication, i.e., inclusion of a MR-DC BC for which the IDC problem only concerns the E-UTRA BC as already reported by affectedCarrierFreqCombList. We prefer to clarify this as follows:
  Remove the 2nd bullet as a redundant trigger does not really cause any problems, i.e., it is only the text regarding setting the fields that needs modification
  Add clarification that MR-DC band combination is reported only if the IDC problem does not only concern the E-UTRA BC <Triggering>

1>if configured to provide IDC indications:
  2>if the UE did not transmit an InDeviceCoexIndication message since it was configured to provide IDC indications:
    3>if on one or more frequencies for which a measObjectEUTRA is -continued <Triggering> configured, the UE is experiencing IDC problems that it cannot solve by itself; or
3>if configured to provide IDC indications for UL CA; and if on one or more supported UL CA combination comprising of carrier frequencies for which a measurement object is configured, the UE is experiencing IDC problems that it cannot solve by itself; or
3>if configured to provide IDC indications for MR-DC, and if on one or more supported MR-DC combination comprising of at least one E-UTRA carrier frequency for which a measurement object is configured and at least one NR carrier frequency included in candidateServingFreqListNR, the UE is experiencing IDC problems that it cannot solve by itself:
    4>initiate transmission of the InDeviceCoexIndication message in accordance with 5.6.9.3;

<Reporting>

1>if the UE is configured to provide IDC indications for MR-DC and there is a supported MR-DC band combination comprising of at least one E-UTRA carrier frequency for which a measurement object is configured and at least one NR carrier frequency included in candidateServingFreqListNR, that is affected by IDC problems; and:
1>if the IDC problem does not only concern the E-UTRA band combination as the UE already included in affectedCarrierFreqCombList:
  2>for each entry of affectedCarrierFreqCombInfoListMRDC in mrdc-AssistanceInfo;
  3>include victim System Type;
  3>include interferenceDirection;
  3>if the UE sets victimSystem Type to wlan or Bluetooth:
    4>include a set of at least one NR carrier frequency included in candidate ServingFreqListNR and optionally one or more E-UTRA carrier frequency for which a measurement object is configured, that is affected by IDC problems;
  3>else:
    4> optionally include a set of at least one NR carrier frequency
included in Altogether, we propose clarifying the procedural specification both of triggering and reporting as shown.

Figure 8:
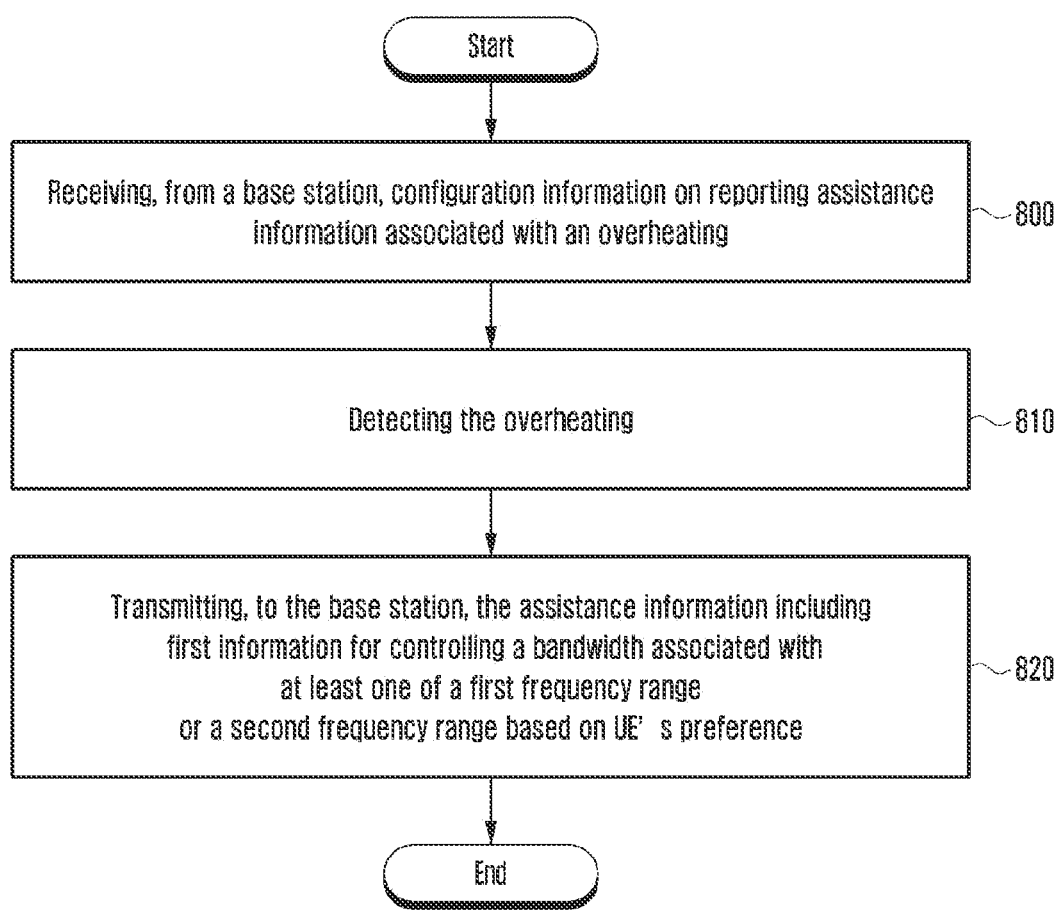
FIG. 8 shows a diagram illustrating an operation in a user equipment (UE) in a wireless communication system according to an embodiment of the disclosure.

FIG. 8 shows a diagram illustrating an operation in a user equipment (UE) in a wireless communication system according to an embodiment of the disclosure;

Referring to FIG. 8, at operation 800, a UE receives, from a base station, configuration information on reporting assistance information associated with an overheating.

At operation 810, a UE detects the overheating.

At operation 820, a UE transmits, to the base station, the assistance information including first information for controlling a bandwidth associated with at least one of a first frequency range or a second frequency range based on UE's preference.

A first frequency corresponding to the first frequency range is smaller from a second frequency corresponding to the second frequency range.

Each of the first frequency range and the second frequency range is associated with uplink carrier and downlink carrier A specific value of the first information is not used for the first frequency range.

The assistance information includes second information for controlling a number of carrier component associated with a downlink cell and an uplink cell.

The assistance information includes third information for controlling a number of MIMO layers associated with the at least one of the first frequency range or the second frequency range.

The configuration information includes information associated with In Device Co-existence, IDC, event.

Figure 9:
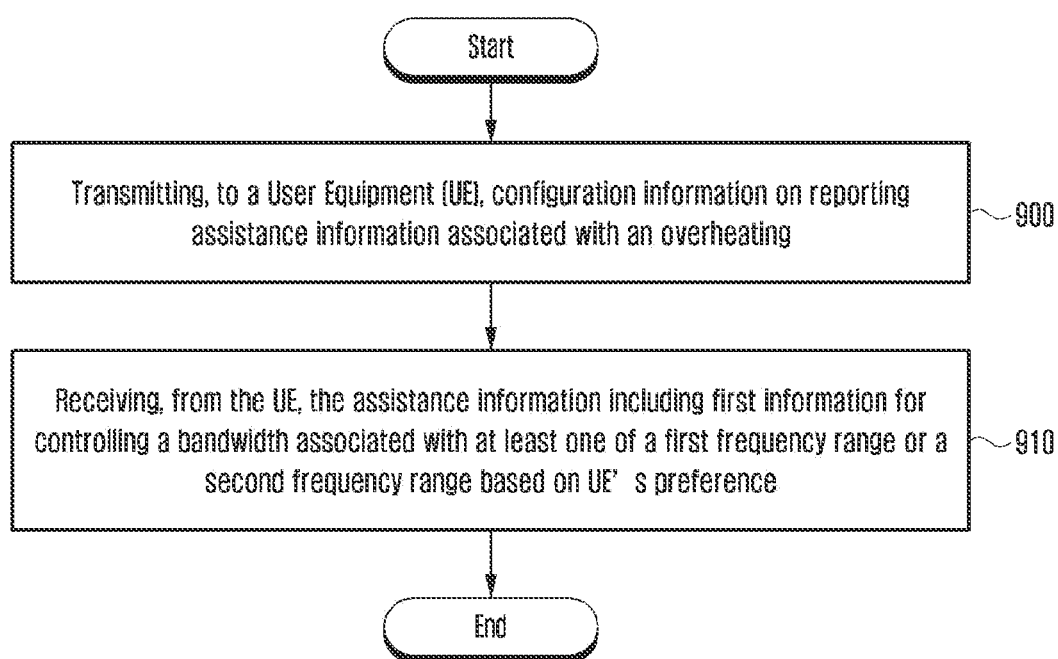
FIG. 9 shows a diagram illustrating an operation in a base station in a wireless communication system according to an embodiment of the disclosure.

FIG. 9 shows a diagram illustrating an operation in a base station in a wireless communication system according to an embodiment of the disclosure;

Referring to FIG. 9, at operation 900, a base station transmits, to a User Equipment (UE), configuration information on reporting assistance information associated with an overheating.

At operation 910, a base station receives, from the UE, the assistance information including first information for controlling a bandwidth associated with at least one of a first frequency range or a second frequency range based on UE's preference A first frequency corresponding to the first frequency range is smaller from a second frequency corresponding to the second frequency range.

Each of the first frequency range and the second frequency range is associated with uplink carrier and downlink carrier A specific value of the first information is not used for the first frequency range.

The assistance information includes second information for controlling a number of carrier component associated with a downlink cell and an uplink cell.

The assistance information includes third information for controlling a number of MIMO layers associated with the at least one of the first frequency range or the second frequency range.

The configuration information includes information associated with In Device Co-existence, IDC, event.

Figure 10:
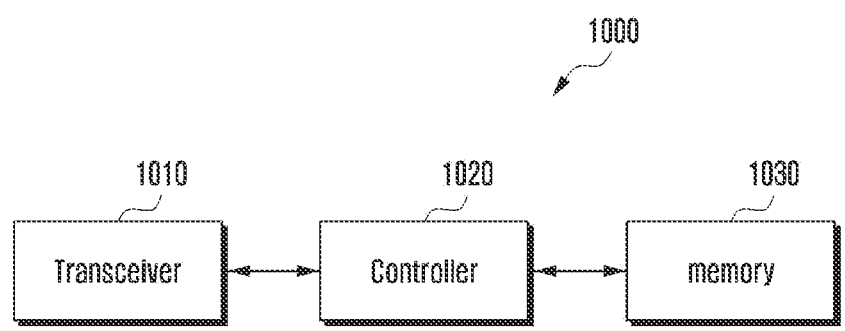
FIG. 10 shows a block diagram of a user equipment (UE) in a wireless communication system according to an embodiment of the disclosure.

FIG. 10 shows a block diagram of a user equipment (UE) in a wireless communication system according to an embodiment of the disclosure.

Referring to FIG. 10, the UE according to various embodiments may include a transceiver 1010, a controller 1020, and a memory or storage unit 1030.

The elements are described below sequentially.

The transceiver according to various embodiments may transmit and receive signals, information or data to and from a base station according to various embodiments of the disclosure. For example, the transceiver may receive a reference signal, system information, or control information.

The controller according to various embodiments may include at least one processor.

The processor according to various embodiments may control an overall operation of the UE. The processor may control an overall operation of the UE according to the above-described various embodiments of the disclosure.

The processor according to various embodiments of the disclosure may control the transceiver to receive, from a base station, configuration information on reporting assistance information associated with an overheating.

The processor according to various embodiments of the disclosure may detect the overheating.

The processor according to various embodiments of the disclosure may control the transceiver to transmit, to the base station, the assistance information including first information for controlling a bandwidth associated with at least one of a first frequency range or a second frequency range based on UE's preference.

A first frequency corresponding to the first frequency range is smaller from a second frequency corresponding to the second frequency range.

Each of the first frequency range and the second frequency range is associated with uplink carrier and downlink carrier A specific value of the first information is not used for the first frequency range.

The assistance information includes second information for controlling a number of carrier component associated with a downlink cell and an uplink cell.

The assistance information includes third information for controlling a number of MIMO layers associated with the at least one of the first frequency range or the second frequency range.

The configuration information includes information associated with In Device Co-existence, IDC, event.

Figure 11:
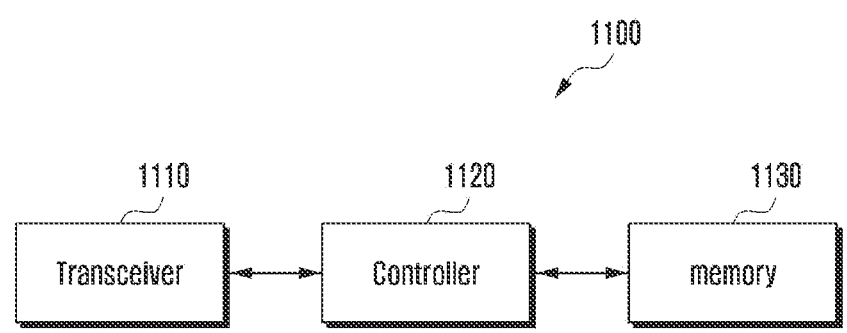
FIG. 11 shows a block diagram of a base station in a wireless communication system according to an embodiment of the disclosure.

FIG. 11 shows a block diagram of a base station in a wireless communication system according to an embodiment of the disclosure.

Referring to FIG. 11, the base station according to various embodiments may include a transceiver 1110, a controller 1120, and a memory or storage unit 1130.

The elements are described below sequentially.

The transceiver according to various embodiments may transmit and receive signals, information or data to and from a UE according to various embodiments of the disclosure. For example, the transceiver may transmit a reference signal, system information, or control information.

The controller according to various embodiments may include at least one processor.

The processor according to various embodiments may control an overall operation of the UE. The processor may control an overall operation of the UE according to the above-described various embodiments of the disclosure.

The processor according to various embodiments of the disclosure may control the transceiver to transmit, to a User Equipment (UE), configuration information on reporting assistance information associated with an overheating.

The processor according to various embodiments of the disclosure may control the transceiver to receive, from the UE, the assistance information including first information for controlling a bandwidth associated with at least one of a first frequency range or a second frequency range based on UE's preference.

A first frequency corresponding to the first frequency range is smaller from a second frequency corresponding to the second frequency range.

Each of the first frequency range and the second frequency range is associated with uplink carrier and downlink carrier A specific value of the first information is not used for the first frequency range.

The assistance information includes second information for controlling a number of carrier component associated with a downlink cell and an uplink cell.

The assistance information includes third information for controlling a number of MIMO layers associated with the at least one of the first frequency range or the second frequency range.

The configuration information includes information associated with In Device Co-existence, IDC, event.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/ or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

Although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

The embodiments of the disclosure and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in the disclosure includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

The various embodiments of the disclosure may be implemented as machine (e.g., computer)-readable storage media (e.g., software (e.g., program) including instructions stored in an internal memory or external memory). A device is an apparatus capable of fetching instructions stored in the storage media and operating according to the fetched instructions, and may include a base station or UE according to various embodiments. If the instruction is executed by the processor (e.g., the controller 1020 of FIG. 10 or the controller 1120 of FIG. 11), a function corresponding to the instruction may be directly performed by the processor or may be performed using other elements under the control of the processor. The instruction may include code generated or executed by a compiler or interpreter.

The machine-readable storage media may be provided in the form of a non-transitory storage medium. In this case, the term "non-transitory" means that the storage media do not include a signal and is tangible, and is not limited to whether data is stored in the storage media semi-permanently or temporally.

The method according to various embodiments disclosed in the disclosure may be included in a computer program product and provided. The computer program product may be traded as a product between a seller and a purchaser. The computer program product may be online distributed in the form of device-readable storage media (e.g., compact disc read only memory (CD-ROM)) or through an app store (e.g., PlayStoreA). In the case of the online distribution, at least some of the computer program product may be at least temporarily stored or temporally generated in storage media, such as the memory of the server of a manufacturer, the server of an app store or a relay server.

Each of elements (e.g., module or program) according to various embodiments may be configured with a single entity or a plurality of entities. Some of the above-described sub-elements may be omitted other sub-elements may be further included in various embodiments. Alternatively, or additionally, some elements (e.g., modules or programs) may be integrated into one entity, and may perform a function, performed by each corresponding element prior to the integration, identically or similarly.

Operations performed by a module, a program or other elements according to various embodiments may be executed sequentially, in parallel, repeatedly, or heuristically, or at least some operations may be executed in different order or may be omitted, or other operations may be added.

The methods of the embodiments illustrated in FIGS. 1 to 7 can include a combination of methods from more than one illustration.

For example, FIGS. 1 to 7 illustrate operations related to controlling a bandwidth based on various embodiments, the methods can include a combination of methods from more than one illustration.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A method performed by a terminal in a wireless communication system, the method comprising:
receiving, from a base station, a radio resource control (RRC) message including configuration information associated with other configurations;

identifying that the terminal is configured to provide overheating assistance information based on the configuration information; and in case that overheating is detected and a prohibit timer for reporting the overheating assistance information is not running, starting the prohibit timer and transmitting, to the base station, the overheating assistance information including first information indicating a terminal's preference on a reduce configuration, wherein the reduce configuration includes information on a maximum aggregated bandwidth across carriers of at least one of a first frequency range or a second frequency range, a highest frequency of the first frequency range being lower than a lowest frequency of the second frequency range, and wherein the information on the maximum aggregated bandwidth indicates at least one value, and a value of 0 is not used for the first frequency range.

2. The method of claim 1, wherein the reduce configuration further includes at least one of information on a reduced number of component carriers for at least one of a downlink or an uplink, or information on a reduced number of multiple input multiple output (MIMO) layers of a serving cell operating on the at least one of the first frequency range or the second frequency range.

3. The method of claim 1, wherein information on the prohibit timer is configured by the configuration information.

4. The method of claim 1, further comprising:
identifying whether the terminal is configured to provide an in-device coexistence (IDC) indication based on the configuration information; and in case that the terminal is configured to provide the IDC indication, transmitting, to the base station, an IDC indication message including information on at least one serving cell based on IDC problem being detected for the at least one serving cell, wherein the at least one serving cell is identified from a list of candidate serving cells for which the terminal is requested to report the IDC problem, and wherein information on the list of the candidate serving cells is configured by the configuration information and is provided by a value of an absolute radio frequency channel number (ARFCN), the value of the ARFCN indicating a center frequency of a corresponding candidate serving cell.

5. The method of claim 4,
wherein the IDC indication message further includes at least one of second information on a victim system type or third information on interference direction, and wherein the victim system type includes wireless local access network (WLAN) or Bluetooth.

6. A method performed by a base station in a wireless communication system, the method comprising:
transmitting, to a terminal, a radio resource control (RRC) message including configuration information associated with other configurations, wherein the other configurations include a first configuration for the terminal to report overheating assistance information; and receiving, from the terminal, the overheating assistance information including first information indicating a terminal's preference on a reduce configuration, wherein the reduce configuration includes information on a maximum aggregated bandwidth across carriers of at least one of a first frequency range or a second frequency range, a highest frequency of the first frequency range being lower than a lowest frequency of the second frequency range, and wherein the information on the maximum aggregated bandwidth indicates at least one value, and a value of 0 is not used for the first frequency range.

7. The method of claim 6, wherein the reduce configuration further includes at least one of information on a reduced number of component carriers for at least one of a downlink or an uplink, or information on a reduced number of multiple input multiple output (MIMO) layers of a serving cell operating on the at least one of the first frequency range or the second frequency range.

8. The method of claim 6, wherein information on a prohibit timer for reporting the overheating assistance information is configured by the configuration information.

9. The method of claim 6, further comprising:
receiving, from the terminal, an in-device coexistence (IDC) indication message including information on at least one serving cell associated with IDC problem, based on the other configurations including a second configuration for the terminal to provide the IDC indication message, wherein the at least one serving cell is identified from a list of candidate serving cells for which the terminal is request to report the IDC problem, and wherein information on the list of the candidate serving cells is configured by the configuration information and is provided by a value of an absolute radio frequency channel number (ARFCN), the value of the ARFCN indicating a center frequency of a corresponding candidate serving cell.

10. The method of claim 9,
wherein the IDC indication message further includes at least one of second information on a victim system type or third information on interference direction, and wherein the victim system type includes wireless local access network (WLAN) or Bluetooth.

11. A terminal in a wireless communication system, the terminal comprising:
a transceiver; and
a controller configured to:
control the transceiver to receive, from a base station, a radio resource control (RRC) message including configuration information associated with other configurations;

identify that the terminal is configured to provide overheating assistance information based on the configuration information; and in case that overheating is detected and a prohibit timer for reporting the overheating assistance information is not running, start the prohibit timer and control the transceiver to transmit, to the base station, the overheating assistance information including first information indicating a terminal's preference on a reduce configuration, wherein the reduce configuration includes information on a maximum aggregated bandwidth across carriers of at least one of a first frequency range or a second frequency range, and a highest frequency of the first frequency range being lower than a lowest frequency of the second frequency range, and wherein the information on a maximum aggregated bandwidth indicates at least one value, and a value of 0 is not used for the first frequency range.

12. The terminal of claim 11, wherein the reduce configuration further includes at least one of information on a reduced number of component carriers for at least one of a downlink or an uplink, or information on a reduced number of multiple input multiple output (MIMO) layers of a serving cell operating on the at least one of the first frequency range or the second frequency range.

13. The terminal of claim 11, wherein information on the prohibit timer is configured by the configuration information.

14. The terminal of claim 11,
wherein the controller is further configured to identify whether the terminal is configured to provide an in-device coexistence (IDC) indication based on the configuration information, and in case that the terminal is configured to provide the IDC indication, and control the transceiver to transmit, to the base station, an IDC indication message including information on at least one serving cell based on IDC problem being detected for the at least one serving cell,
wherein the at least one serving cell is identified from a list of candidate serving cells for which the terminal is requested to report the IDC problem, and
wherein information on the list of the candidate serving cells is configured by the configuration information and is provided by a value of an absolute radio frequency channel number (ARFCN), the value of the ARFCN indicating a center frequency of a corresponding candidate serving cell.

15. The terminal of claim 14,
wherein the IDC indication message further includes at least one of second information on a victim system type or third information on interference direction, and
wherein the victim system type includes wireless local access network (WLAN) or Bluetooth.

16. A base station in a wireless communication system, the base station comprising:
a transceiver; and
a controller configured to:
control the transceiver to transmit, to a terminal, a radio resource control (RRC) message including configuration information associated with other configurations, wherein the other configurations include a first configuration for the terminal to report overheating assistance information; and
control the transceiver to receive, from the terminal, the overheating assistance information including first information indicating a terminal's preference on a reduce configuration,
wherein the reduce configuration includes information on a maximum aggregated bandwidth across carriers of at least one of a first frequency range or a second frequency range, a highest frequency of the first frequency range being lower than a lowest frequency of the second frequency range, and
wherein the information on a maximum aggregated bandwidth indicates at least one value, and a value of 0 is not used for the first frequency range.

17. The base station of claim 16, wherein the reduce configuration further includes at least one of information on a reduced number of component carriers for at least one of a downlink or an uplink, or information on a reduced number of multiple input multiple output (MIMO) layers of a serving cell operating on the at least one of the first frequency range or the second frequency range.

18. The base station of claim 16, wherein information on a prohibit timer for reporting the overheating assistance information is configured by the configuration information.

19. The base station of claim 16,
wherein the controller is further configured to control the transceiver to receive, from the terminal, an in-device coexistence (IDC) indication message including information on at least one serving cell associated with IDC problem, based on the other configurations including a second configuration for the terminal to provide the IDC indication message,
wherein the at least one serving cell is identified from a list of candidate serving cells for which the terminal is request to report the IDC problem, and
wherein information on the list of the candidate serving cells is configured by the configuration information and is provided by a value of an absolute radio frequency channel number (ARFCN), the value of the ARFCN indicating a center frequency of a corresponding candidate serving cell.

20. The base station of claim 19,
wherein the IDC indication message further includes at least one of second information on a victim system type or third information on interference direction, and
wherein the victim system type includes wireless local access network (WLAN) or Bluetooth.

* * * * *